Nov. 12, 1963 D. L. LAFUZE 3,110,857

MAGNETIC AMPLIFIER CIRCUIT

Filed June 27, 1960 2 Sheets-Sheet 1

INVENTOR.
DAVID L. LAFUZE
BY Lawrence G. Norris
ATTORNEY

INVENTOR.
DAVID L. LAFUZE
BY Lawrence G. Norris
ATTORNEY

United States Patent Office 3,110,857
Patented Nov. 12, 1963

3,110,857
MAGNETIC AMPLIFIER CIRCUIT
David L. Lafuze, Cincinnati, Ohio, assignor to General Electric Company, a corporation of New York
Filed June 27, 1960, Ser. No. 39,160
5 Claims. (Cl. 323—89)

This invention relates to magnetic amplifiers and more particularly to a biasing arrangement for magnetic amplifiers.

My invention presently finds its primary application in magnetic amplifiers of the type in which the core sections are reset by means of a biasing arrangement during alternate half cycles of the alternating current power supply. In the operation of amplifiers of this type two distinct intervals exist, a saturating interval and a reset interval. These two intervals generally correspond in time to the half cycle periods of the alternating current supply source so that the saturating interval takes place during one-half cycle of the source and the reset interval takes place during the alternate half cycle of the source.

During the saturating interval energy from the alternating current source is supplied to the amplifier. A portion of this energy is absorbed by the core and the remainder of the energy is absorbed by the load circuit. At the beginning of the saturating interval assuming the core is not already saturated, the energy supplied is entirely absorbed by the core. The core continues to absorb all of the energy until it becomes saturated. Once the core has become saturated it absorbs no further energy, thereafter allowing the energy supplied during the remaining portion of the saturating interval to be consumed entirely in the load circuit. Thus, the amount of energy supplied to the load circuit is that portion of the alternating current wave which occurs after the core has become saturated.

Magnetic amplifiers generally employ cores of the square loop type. A characteristic of such a core is that once it becomes saturated it remains saturated even though no additional energy is applied to the core. If nothing is done to the core during the reset interval it is saturated at the beginning of the subsequent saturating interval and remains saturated throughout the saturating interval. In such a situation all of the energy supplied to the amplifier from the alternating current supply source is absorbed by the load circuit. The core absorbs none of this energy. If control is to be exercised over the amount of energy supplied to the load circuit the core must be desaturated during the reset interval. The desaturation during the reset interval causes the energy supplied during the subsequent saturation interval to split between the core and the load circuit. Control of the amount of energy applied to the load circuit is thereby achieved.

The desaturation of the core is commonly accomplished by employing a bias circuit and a control circuit. In the typical case the bias circuit desaturates the core to a predetermined point generally midway down the desaturated range corresponding to the zero flux level. The control signal either aids or opposes the bias signal depending on the polarity of the control signal. The combined effect of the control and bias signals is to reset the core about the midpoint or zero flux level, the distance above or below the mid-point being determined by the magnitude and polarity of the control signal. In other words, in typical prior art magnetic amplifiers the bias circuit is used merely to desaturate the core by a predetermined amount during the reset interval, the control signal then acting to determine the magnitude and direction of reset about the point established by the bias signal.

Magnetic amplifier sections may be coupled together in several ways depending upon the effect desired. For example, two magnetic amplifier sections may be coupled together to form a full wave amplifier with one of the sections going through its saturating interval and supplying the load during one half cycle and the other section supplying the load during the other half cycle, each section passing through its reset interval while the other is going through its saturating interval. Or, two or more sections may be coupled together to form two sides of a push-pull amplifier arrangement. In this kind of an arrangement the corresponding sections of the two sides of the amplifier pass through their saturating and reset intervals simultaneously and the outputs of the two sides are subtracted from each other. In the push-pull amplifier the control circuit is connected such that the control signal drives one side of the amplifier in one direction and the other side of the amplifier in the opposite direction, the output then being determined by the difference between the outputs of the two sides of the amplifier produced by the control signal. Each side of a push-pull magnetic amplifier may be formed of two sections connected as described above to produce full wave operation, in which case the amplifier is referred to as a full wave, push-pull amplifier.

I have observed that in the case of the full wave, push-pull magnetic amplifier there exists a gain enhancing effect somewhat similar to that achieved by positive feedback by reason of the fact that the control signal drives the two sides of the amplifier in opposite directions. This difference in direction of the control signal on the two sides of the amplifier causes the B-H loops of the two sides to be displaced in opposite directions which upsets the voltage distribution between the series connected control windings, thus causing a greater differential reset between the two sides of the amplifier and hence a greater output than what otherwise would be expected. A similar gain enhancing effect is not achieved through the bias windings, however, because the bias windings must generally be connected to drive the cores in the same direction or always back to the preselected reset point.

It is an object of my invention to provide an improved magnetic amplifier in which additional reset energy is coupled through the bias circuit to increase the gain of the amplifier.

It is another object of my invention to provide an improved magnetic amplifier in which the bias circuit is utilized to couple reset energy from an amplifier section which is passing through its saturating interval to another amplifier section which is passing through its reset interval.

It is another object of my invention to provide an improved full wave, push-pull magnetic amplifier in which the bias circuit is arranged to provide unequal desaturation of the two push-pull sections during the reset interval to increase the gain of the amplifier.

In accomplishing these and other objects of my invention in one embodiment thereof having four amplifier sections arranged to operate full wave, push-pull, I provide a bias circuit in which the two bias windings on one side of the amplifier are connected in series with each other and the two bias windings on the other side of the amplifier are connected in series with each other. The two series connected sets of bias windings are then connected in parallel with each other in such a manner that energy is coupled from the sections passing through their saturating intervals into the sections passing through their reset intervals. When the sections passing through the saturating intervals simultaneously produce different ouputs i.e. in accordance with the push-pull arrangement, the amounts of energy coupled into the other two cores through the bias circuit is unequal and in a direction to increase the amount of differential reset between the two sides of the amplifier, thus increasing the output and the gain of the amplifier.

My invention will be better understood and other objects and advantages thereof will become apparent from the following specification taken in connection with the accompanying drawings in which:

FIG. 1 is a schematic of a simplified magnetic amplifier;

FIGS. 2*a*, 2*b* and 2*c* show various wave shapes which may appear across the load resistor of the simplified magnetic amplifier;

Figure 4:
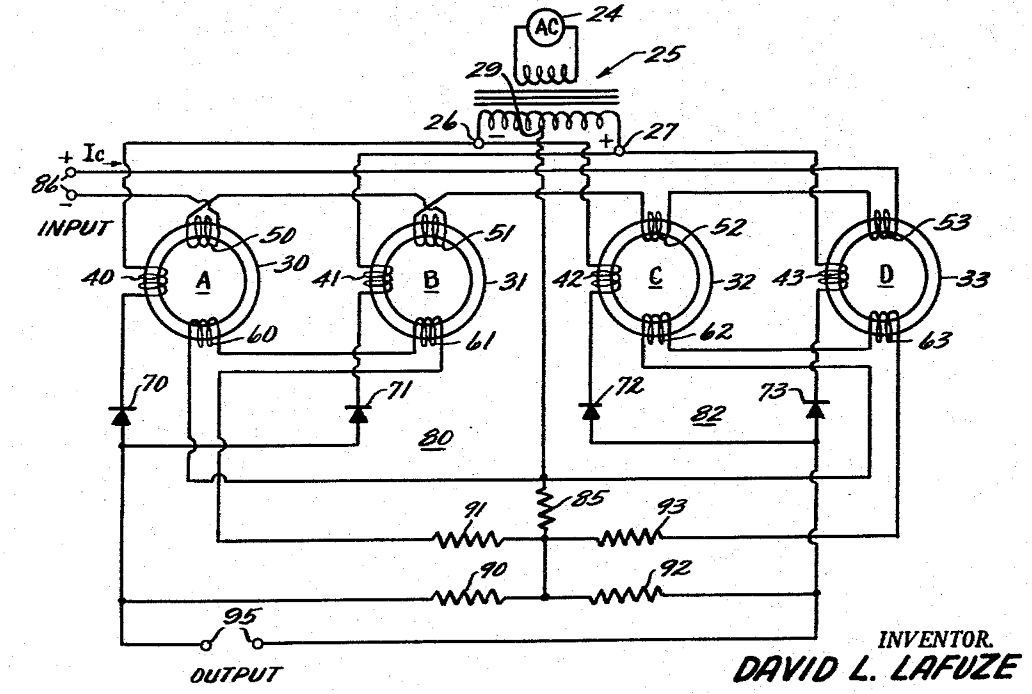
FIG. 4 is a schematic diagram of a push-pull full wave magnetic amplifier employing a bias circuit in accordance with this invention.
Figures 5A, 5B, 6A, 6B, 6C, 6D, 6E, 7A, 7B, 8:
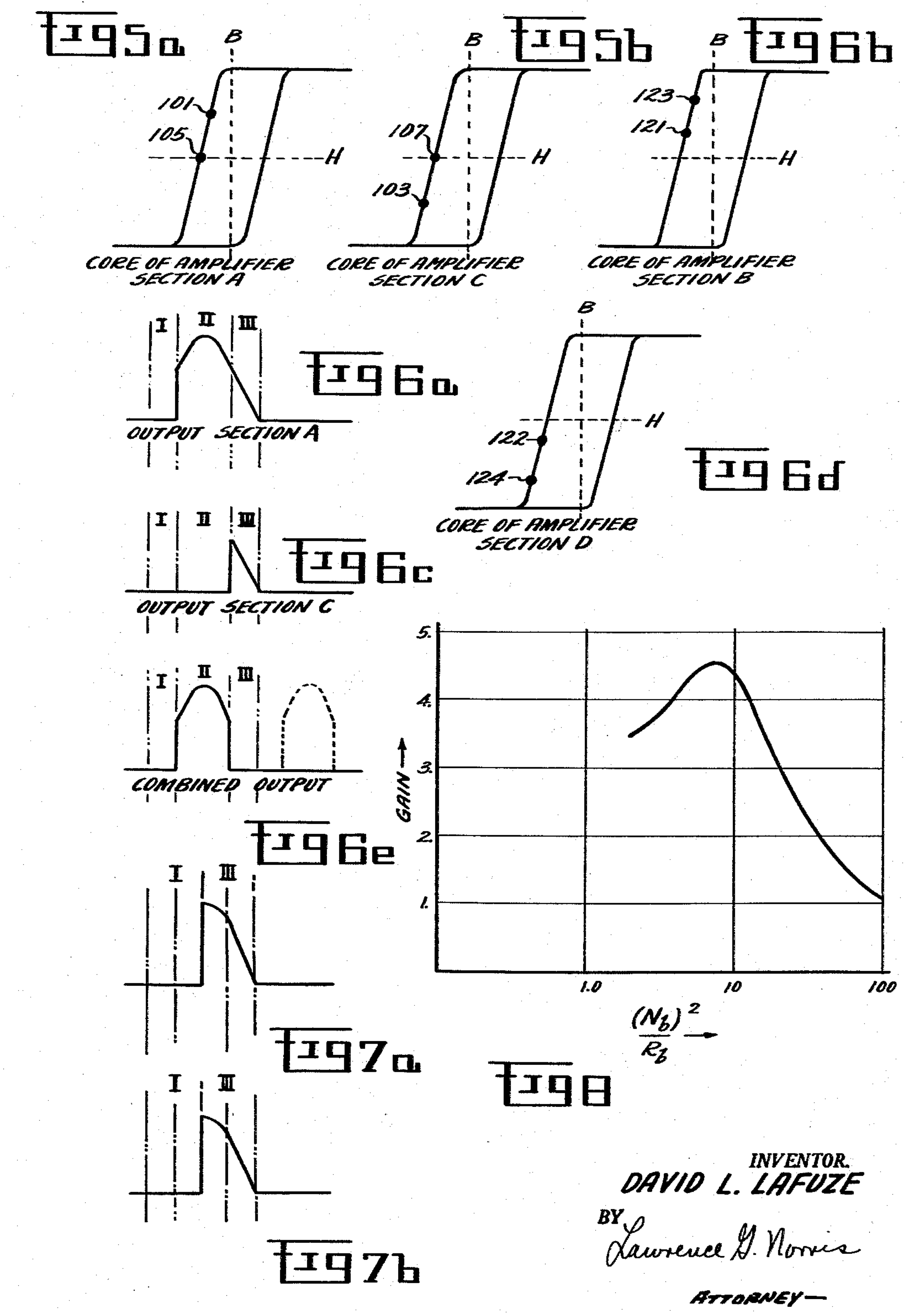

FIGS. 5*a* and 5*b* show the hysteresis loops of two of the cores shown in the amplifier of FIG. 4;

FIGS. 6*a* through 6*e* show the wave shapes taken across various components of the amplifier of FIG. 4 and two hysteresis loops of two of the cores in the amplifier of FIG. 4;

FIGS. 7*a* and 7*b* show the wave shapes taken across various components during the no input signal condition;

FIG. 8 is a curve showing the amplifier gain versus the turns and resistance ratio.

Figure 1:
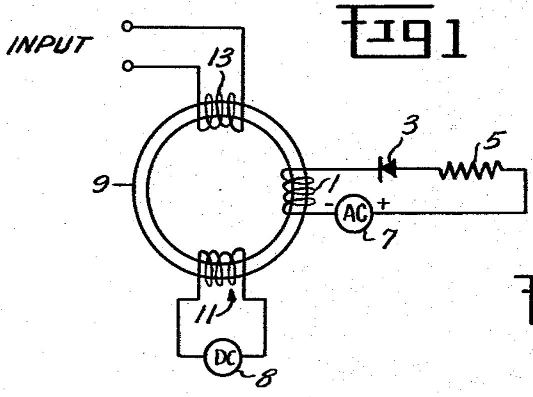
Figure 2A:
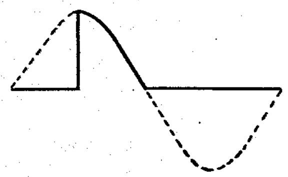
Figures 2B, 2C:
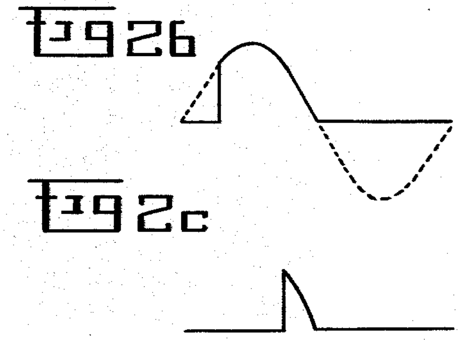
Figure 3:
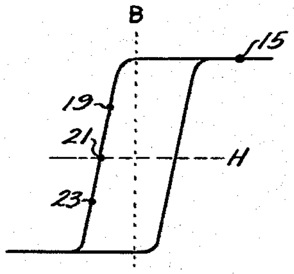
FIG. 3 is the hysteresis curve of the core in the simplified magnetic amplifier.

The present invention may best be understood by referring to FIGS. 1, 2 and 3 wherein a basic magnetic amplifier and its operating characteristics are shown. The essential components of this amplifier are a core 9, which preferably has a substantially square B-H characteristic; a biasing circuit including a bias winding 11 adapted to be supplied from a suitable direct current source 8; an output circuit having an A.C. source 7, a load resistor 5, a diode 3 and a gate winding 1; and an input circuit which includes a control winding 13 adapted to receive an input signal. During a first half cycle of the A.C. source 7, the polarity of the source is as shown in the drawing, and therefore the diode 3 allows current to flow in the output circuit. As current flows through the gate winding 1 in FIG. 1 a flux is created in the core 9 which tends to drive the core into saturation as represented by a point 15 on the hysteresis curve in FIG. 3.

During a second half cycle, the polarity of the source 7 is reversed, and the diode 3 does not allow any current to flow in the output circuit. During this half cycle the core is desaturated or reset so that some control may be exercised over the saturating characteristics during the subsequent half cycle. The D.C. source 8 causes a current to flow in the bias winding 11 which creates a flux in the core 9 opposite in direction to that created by current flow in the gate winding 1 during the previous half cycle. This flux alone desaturates or resets the core to the point 21 on the hysteresis curve in FIG. 3. The input signal, depending on its polarity, causes a current flow through the control winding 13 which creates a flux in the core 9 which either aids or opposes the flux created in the core by the current flow through bias winding 11. If the control winding flux opposes, the core is reset to the point 19; if it aids, however, the core is reset to the point 23. During this half cycle the core 9 is desaturated or reset, and this is the time interval previously referred to as the reset interval.

During a third half cycle of the source 7 the polarity is again as shown in the drawing, and current flows in the output circuit. At the beginning of this cycle the core 9 is not saturated. The gate winding 1 therefore presents a high impedance to the output circuit causing most of the potential developed by the A.C. source 7 to be applied across the gate winding 1. Virtually no potential is developed across the serially connected load resistor 5. This condition of high impedance of the gate winding 1 continues until the core 9 has absorbed a sufficient amount of energy to take it to saturation. After the core 9 becomes saturated the gate winding 1 presents a low impedance. This allows the voltage from the source 7 to be developed almost entirely across the load resistor 5. During this third half cycle the core 9 is saturated, and this in the time interval previously referred to as the saturating interval.

The energy supplied to the amplifier by the source 7 is absorbed by the core 9 when the gate winding impedance is high, i.e., when the core is being saturated, and by the load resistor 5 when the gate winding impedance is low. If during the reset interval the core 9 is only slightly desaturated, as for example, to the point 19 on the hysteresis curve in FIG. 3, only a small amount of time is required to saturate the core during the subsequent saturating interval. This results in a relatively large period of time during which potential is developed across the load resistor 5 as shown in FIG. 2*b*. On the other hand if no input signal is applied to the control winding 13, the D.C. source 8 causes the core to be reset to the point 21 in FIG. 3, and a greater portion of the saturating cycle is required to saturate the core. As shown in FIG. 2*a* the potential developed across the load resistor 5 is reduced. If the input signal is such that the core is reset to the point 23 in FIG. 3, a still longer saturating time is required, resulting in a very short time during which potential is developed across the load resistor 5 as shown in FIG. 2*c*. It is seen therefore that a relatively small amount of input signal applied to the control winding 13 effects a relatively large variation in the signal developed across the load resistor 5.

In FIG. 4 an illustrative magnetic amplifier according to this invention is shown with four cores arranged to operate full wave and push-pull. It is to be understood that the present invention is in no way limited to this specific amplifier since other suitable amplifiers may equally well be employed. The core 30 with its associated gate winding 40, diode 70, bias winding 60 and control winding 50 is essentially a single core amplifier operating substantially the same as that shown in FIG. 1 which produces an output in the load resistor 90. This unit is referred to as amplifier section A. Likewise, the core 31 with its associated gate winding 41, diode 71, bias winding 61 and control winding 51 forms amplifier section B. Section A is connected as shown with amplifier section B to operate full wave, i.e., one section passes through its saturating interval while the other passes through its reset interval and vice versa.

For purposes of illustration let it be assumed that during the first half cycle the A.C. source 24 causes the potential on the secondary winding of the transformer 25 to be positive at terminal 27 and negative at terminal 26. Current flows from the terminal 26 through the gate winding 40, diode 70, resistor 90, resistor 85 and back to the center tap 29 of the transformer. During this same half cycle current does not flow from the terminal 27 through the gate winding 41 because the diode 71 is biased in the reverse direction and does not conduct. During this first half cycle amplifier section A, associated with gate winding 40, passes through its saturating interval while amplifier section B, associated with gate winding 41, passes through its reset interval. On the second half cycle the polarity of the secondary winding of the transformer 25 reverses. The terminal 27 becomes positive, and the terminal 26 becomes negative. During this half cycle the diode 71 allows current to flow through the gate winding 41, and the diode 70 blocks the passage of current through the gate winding 40.

The full wave operation is readily apparent when it is noted that during the first half cycle of operation amplifier section A passes through its saturating interval and develops an output signal across the resistors 90 and 85. Similarly, during the second half cycle amplifier section B passes through its saturating interval and also develops an output signal across the resistors 90 and 85. Since the two amplifier sections produce an output in the same load resistors during alternate half cycles, full wave operation is achieved. Amplifier section A and amplifier section B form a first full wave section 80 of the entire amplifier.

The core 32 with its associated gate winding 42, diode 72, bias winding 62 and control winding 52 forms an amplifier section C which passes through its saturating interval during the same half cycle as amplifier section A. Accordingly, amplifier section C produces an output pulse in the resistors 92 and 85 during a first half cycle. The core 33 with its associated gate winding 43, diode 73, bias winding 63 and control winding 53 forms an amplifier section D which operates on the same half cycle as section B, and it produces an output pulse in the resistors 92 and 85 during the second half cycle. Thus sections C and D operate full wave and form a second full wave section 82 of the amplifier.

The two full wave sections 80 and 82 provide push-pull operation. As is seen in FIGS. 2*a* *b* and *c* the output signal of a single core magnetic amplifier always has the same polarity even though the input signal may change polarity. In situations where it is desired to have an output signal which changes in polarity whenever the input signal changes in polarity, push-pull type operation is generally employed.

For the purpose of explaining the push-pull arrangement, assume that only the amplifier sections A and C are present. This can be done easily since amplifier sections B and D operate in a like manner but on alternate half cycles. For purposes of explanation, assume further that the input signal applied to the terminals 86 has the polarity indicated. This causes a current $I_c$ to flow in the serially connected control windings 50 and 52 disposed on respective cores 30 and 32. The control winding 50 is oriented so that when current $I_c$ flows through the control winding 50, a flux is created in the core 30 which opposes the flux simultaneously created by current in the bias winding 60. The control winding 52 is oriented so that the flux created by the flow of current $I_c$ therethrough aids the flux created by current flow through the bias winding 62. It is assumed at this point that flux created by current flow through the bias windings 60 and 62 is constant and taken by itself resets the cores to the points 105 and 107 on curves in FIGS. 5*a* and 5*b*. Later on in this specification it is pointed out that the points at which the cores are reset may vary; however, they are assumed constant at this time to simplify the present explanation.

At the end of the reset interval the core 30 in FIG. 4 is reset to the point 101 on the hysteresis curve in FIG. 5*a* because of the opposing effect of the fluxes. Similarly, the core 32 in FIG. 4 is reset to the point 103 on the hysteresis curve in FIG. 5*b* because of the aiding effect of the fluxes. During the subsequent saturating interval the core 30 in FIG. 4 saturates after a comparatively short period of time and allows a voltage shown in FIG. 6*a* to be produced across the resistors 90 and 85 in FIG. 4. The core 32 takes longer to saturate, and it produces a voltage shown in FIG. 6*c* across the resistors 92 and 85 of FIG. 4. The resulting current flow is from left to right in the resistor 90 and from right to left in the resistor 92. The combined signal taken across the two resistors 90 and 92 is the difference between the voltage shown in FIG. 6*a* and that shown in FIG. 6*c*. This difference voltage appears at the output terminals 95, and its waveform is shown in FIG. 6*e*. The amplifier sections B and D operate similarly to create a pulse at output terminals 95 during the alternate half cycle, and the resulting waveform is shown in dotted lines on FIG. 6*e*.

If the input signal increases in magnitude, the point 101 in FIG. 5*a* is pushed further up and the point 103 in FIG. 5*b* is pushed further down, resulting in a larger pulse across the resistor 90 in FIG. 4 and a smaller pulse across the resistor 92. Since the difference between the pulses across the resistors 90 and 92 is increased, a wider pulse containing increased energy appears at the output terminals 95. If the signal applied to the input terminal 86 happens to be zero, the bias windings alone reset the cores 30 and 32 to the respective points 105 and 107 in FIGS. 5*a* and 5*b*. This results in substantially equal and opposite voltage pulses being produced across the resistors 90 and 92. Thus no difference in voltage is produced across the output terminals 95. If the input signal applied to terminals 86 changes polarity, the potential developed across the resistor 92 is larger than that developed across the resistor 90, and this causes the voltage developed across the output terminals 95 to change polarity.

There is provided according to this invention an amplifier arrangement having a bias circuit which increases the gain and sensitivity automatically. This bias circuit includes the bias windings 60, 61, 62 and 63. The bias windings 60 and 61 are connected in series and then placed in parallel with the resistor 85. Similarly, the bias windings 62 and 63 are connected in series and placed in parallel with the resistor 85. By placing the series connected bias windings in two separate parallel circuits a substantial and unexpected increase in amplifier gain and sensitivity results. The manner in which this increase in gain is derived may best be understood by observing the operation of the amplifier during the following distinct operation conditions: when the polarity of the input signal is as shown at terminals 86 in FIG. 4, when the magnitude of the input signal is zero, and when the polarity of the input signal at terminal 86 is reversed from that shown in FIG. 4.

Assume first that the polarity of the input signal at terminals 86 in FIG. 4 is as shown. In the interest of simplicity, operation is first observed during only one half cycle. For illustrative purposes assume that during this half cycle cores A and C are passing through their saturating interval and the cores B and D are passing through their reset interval. Under these conditions the following takes place:

(1) Amplifier section A passes through its saturating interval and requires a relatively short time to reach saturation. The signal developed by this section across the resistors 90 and 85 in FIG. 4 is a relatively large output pulse as shown in FIG. 6*a*.

(2) Amplifier section C passes through its saturating interval and requires a relatively long time to reach saturation. The signal developed by this section across the resistors 92 and 85 in FIG. 4 is a relatively small output pulse as shown in FIG. 6*c*.

(3) The core B is reset to the point 123 shown in FIG. 6*b*.

(4) The core D is reset to the point 124 shown in FIG. 6*d*.

It is particularly important to observe the manner in which the core 31 of section B and the core 33 of section D receive energy for reset purposes through their respective bias windings 61 and 63. The manner in which reset energy is imparted to the cores 31 and 33 may best be understood by further dividing the half cycle being observed into three time periods I, II and III as shown in FIGS. 6*a*, 6*c* and 6*e*. During the time periods I and III the cores 31 and 33 receive an equal amount of reset energy from the bias circuit. During the time period II the core 33 receives more reset energy than the core 31.

It is apparent by observing the curves in FIGS. 6*a* and 6*c* that neither core 30 of section A in FIG. 4 or core 32 of section C is saturated during the time period I. Throughout the time period I the current through the gate winding 40 causes a change of flux in the core 30. This change of flux in the core 30 develops a potential in the bias winding 60. Similarly, a potential is developed in the bias winding 62 because of the change of flux in the core 32 created by current through the gate winding 42. The potential developed by the bias winding 60 causes current to flow through the serially connected bias winding 61. Likewise, the potential developed in the bias winding 62 causes current to flow through the serially connected bias winding 63. It is readily observed that the energy imparted to the core 31 by the associated bias winding 61 and the energy imparted to the core 33 by the associated bias winding 63 is approximately equal throughout the time period I.

Throughout the time period III the cores 31 and 33 also receive approximately equal amounts of reset energy from their respective bias windings 61 and 63. Referring to FIGS. 6*a* and 6*c*, it is apparent that both amplifier section A and amplifier section C are producing outputs in their respective load circuit during this time period. Accordingly, the cores 30 and 32 are saturated and relatively little change of flux occurs in these cores. Since there is relatively little change in flux in these cores, virtually no potential is developed in the respective bias windings 60 and 62. As both amplifier sections A and C are, however, developing an output potential, a potential does appear across the resistor 85 which is in the output circuit of both sections. The bias windings 61 and 63 are similarly connected in parallel with the resistor 85 and therefore an approximately equal current flows in each of these windings. Accordingly, an equal amount of energy is imparted to core 31 and core 33 during the time interval III.

During the time period II an unequal amount of reset energy is imparted to the cores 31 and 33. It is this unequal energization of the two cores which is responsible for the increased gain of the amplifier circuit of the present invention. Referring to FIGS. 6*a* and 6*c*, it is apparent that amplifier section A is producing an output in its respective load circuit during the time period II. Amplifier section C is not producing any output during this interval. This means that throughout the time period II the core 30 of section A is saturated and the core 32 of section C is not saturated. Since the core 32 is not saturated, current flow through the gate winding 42 causes a change of flux in the core 32 thus creating a potential in the bias winding 62. The potential developed in the bias winding 62 causes a current to flow through the bias winding 63 imparting energy to the core 33. The bias winding 61 is in parallel with the resistor 85. As the resistor 85 is in series with the bias windings 62 and 63, the current flow caused by the potential developed in bias winding 62 also flows through the resistor 85. This results in some current flow through the bias winding 61 and the imparting of some energy into core 31. It may readily be observed, however, that the amount of energy imparted to the core 31 is relatively small compared to the amount of energy imparted to the core 33. Throughout the time period II the amplifier section A produces an output in its respective load circuit which includes the resistor 85. As the bias windings 61 and 63 are similarly connected in parallel with the resistor 85, the cores 31 and 33 each receive an equal amount of reset energy from this source during the time period II.

In summing up the operation during the time periods I, II, and III, it is noted that the cores 31 and 33 receive an equal amount of reset energy during the time periods I and III. During the time period II, however, the core 33 receives more reset energy than does the core 31. The total effect throughout the three time periods is that the core 33 receives a somewhat larger amount of reset energy than does the core 31. The effect of the unequal amounts of reset energy may be seen by referring to FIG. 6*b* which shows the hysteresis loop of the core 31 and FIG. 6*d* which shows the hysteresis loop of the core 33. As the core 33 of amplifier section D receives the larger amount of reset energy, this core is reset to the point 122 on the curve of FIG. 6*d*. The core 31 of the amplifier section B receives the smaller amount of reset energy and is therefore desaturated only to the point 121 on the curve of FIG. 6*b*.

During the three operating conditions of the amplifier, the first of which is presently being examined, the potential at terminals 86 in FIG. 4 is assumed to be that shown. Accordingly, the current flow $I_c$ through the control winding 51 creates a flux in the core 31 which opposes the direction of the flux created by current flow through the bias winding 61. As these fluxes oppose, the combined effect is a lesser amount of desaturation in the core 31 as represented by the point 123 on the curve of FIG. 6*b*. The current flow $I_c$ through the control winding 53 creates a flux in the core 33 which is in the same direction as the flux created by current flow through the bias winding 63. As these fluxes aid one another, the combined effect is to drive the core 33 deeper into desaturation than would be the case if either flux existed by itself. Thus, the core 33 is desaturated to the point 124 on the curve of FIG. 6*d*. It should be noted at this point that the core 33 of section D is the core driven further into desaturation by the control signal and is also the core which is driven further into desaturation by receiving the larger amount of reset energy. It is readily apparent therefore that the bias circuit aids the control circuit in desaturating the core 33. It should also be noted that the control winding 51 of section B creates a flux in the associated core 31 tending to decrease the amount of desaturation in the core 31. It is this same core which receives the decreased amount of reset energy. Accordingly, it is readily apparent that the bias circuit aids the control circuit in establishing a lesser amount of desaturation in the core 33 of amplifier section B.

Still assuming the polarity at terminals 86 to be as shown in FIG. 4 the operation of the amplifier is similar in a subsequent half cycle. During the subsequent half cycle the amplifier sections B and D pass through their saturating intervals and the sections A and C pass through their reset intervals. During this half cycle the cores 30 and 32 respectively associated with the amplifier sections A and C are reset in a manner similar to that in which amplifier sections B and D were reset in the previous half cycle. The amplifier section B passes through its saturating interval. The core 31, associated with this amplifier section, is only slightly desaturated as a result of a previous reset interval. Amplifier section B, therefore, produces a relatively large output pulse across the resistor 90 similar to that shown in the curve of FIG. 6*a*. The amplifier section D is also passing through its saturating interval. The core 33 associated with amplifier section D is largely desaturated as a result of the previous reset interval. Accordingly, this section produces a relatively small output pulse across the resistor 92 similar to that shown in the curve of FIG. 6*c*. The difference between the pulse across the resistor 90 and the pulse across the resistor 92 appears at the terminals 95 in FIG. 4, and is similar to that shown in FIG. 6*e*.

The second operating condition which may occur in this amplifier is when no input signal is applied to the terminals 86. Under such condition no output is produced, that is to say, zero input produces zero output. Here neither the control circuit nor the bias circuit act to unequally reset the cores. As the necessary difference in pulses across the resistors 90 and 92 does not occur, no output at terminals 95 results. During the zero input condition no current flows through the control windings 50, 51, 52 and 53. Accordingly, there is no aiding or opposing of fluxes in different cores to create the push-pull effect. The cores of the two sections which normally operate in push-pull, such as the sections A and C, are desaturated equally during their reset interval. On the subsequent saturating interval both of the cores require the same amount of time to reach saturation. The output pulse developed by amplifier section A across resistor 90 is shown in the curve of FIG. 7*a* and the pulse developed by amplifier section C across resistor 92 of FIG. 4 is shown in the curve of FIG. 7*b*. As these pulses are substantially identical the difference which appears at terminals 95 is therefore zero. It should be noted that in FIGS. 7*a* and 7*b* only two time periods occur. These are the time period I, during which neither core is saturated, and the time period III, during which both cores are saturated. During the time periods I and III, both cores receive an equal amount of reset energy. The time period II, during which one core is saturated and other is not saturated, no longer exists. It is only during the time interval II that an unequal bias may take place. Accordingly, in the situation where no input signal is applied to the terminals 86 the core 31 of section B and the core 33 of section D receive equal amounts of energy during their reset interval.

The third possible situation in the operation of this amplifier is when the input signal changes polarity from that shown at terminals 86 in FIG. 4. When this situation arises the current flow resulting from the input signal creates a flux which opposes the flux created by current in the bias windings in the cores 32 and 33 instead of in cores 30 and 31. Likewise an aiding flux is created in the cores 30 and 31 instead of the cores 32 and 33. Therefore, the larger pulse is developed across the resistor 92; the smaller pulse is developed across the resistor 90 instead of vice versa; and the output signal at the terminals 95 changes polarity.

At this point it may be helpful to indicate more precisely how the amplifier circuit of the present invention achieves an increase in gain and sensitivity. It has previously been pointed out that in the situation where there is zero input signal at the terminals 86, there is zero output at the terminals 95. When an input signal appears at the terminals 86 having the polarity indicated in FIG. 4, a situation represented by the curves in FIGS. 6*a* through 6*e* occurs. The aiding and the opposing effects of fluxes induced through the control windings results in output pulses of different durations as shown in FIGS. 6*a* and 6*c*. It is the difference in the size of these two pulses which creates the output pulse as shown in FIG. 6*e*. As the magnitude of the input signal at terminals 86 increases, the difference between the relative sizes of the pulses shown in FIGS. 6*a* and 6*c* increases. Accordingly, the output pulse as shown in FIG. 6*e* increases. The bias circuit of the present invention also acts to increase the size of the ouput pulse as the magnitude of the input pulse increases. This is accomplished by the bias circuit increasing the difference in the reset points of two cores working in push-pull as pointed out earlier in connection with FIGS. 6*b* and 6*d*. Accordingly, an increase in the difference of the output pulses of the individual sections is achieved and thereby an increase in the size of the output pulse results. It should be noted that the difference in the reset points as created by the bias circuits is proportional to the input signals. This occurs because the time period II is dependent upon the magnitude of the input signal. The difference in the amount of energy being coupled to respective cores to reset them is dependent upon the duration of the time period II. Accordingly, the increase in pulse size which is achieved by the action of the bias circuit also depends on the magnitude of the input signal. It is readily seen therefore that linear gain results.

It will be recalled that earlier in the specification, I made reference to the fact that in a full wave, push-pull magnetic amplifier, some gain increase is obtained by reason of the fact that the control windings are connected to drive the two sides of the amplifier in opposite directions. Now in the application of my invention, it will be observed that for a fixed number of turns on the bias windings a reduction in the resistance of the bias circuit increases the efficiency by which energy is coupled between the cores through the bias windings because there is less energy lost in the resistance. In other words, if the resistance of the bias circuit is reduced, a larger current is produced for a given induced voltage in the bias windings. It will also be observed, however, that the bias circuit is coupled to the control windings through the magnetic path of the amplifier cores. Thus, the control signal sees the bias circuit resistance in parallel with the resetting cores so that a decrease in the bias circuit resistance reduces the efficiency of the control signal action described above in producing a differential reset between the cores. It will be apparent therefore that in any given design embodying my invention and utilizing a configuration of the kind described, these two effects must both be taken into consideration in selecting the parameters of the system.

In FIG. 8, I have shown a typical relationship between amplifier gain and the parameter $$\frac{(N_b)^2}{R_b}$$

presented on a logarithmic scale, where $N_b$ is the number of turns on the bias windings and $R_b$ is the effective resistance of the bias circuit. It will be noted that toward the left hand side of the curve an increase in the magnitude of the parameter $$\frac{(N_b)^2}{R_b}$$

corresponding for example to a decrease in $R_b$, produces an increase in the gain of the amplifier. In this region the efficiency by which energy is coupled between the bias windings increase at a faster rate than the resulting decrease in efficiency in the action of the control signal in producing the differential reset action mentioned above. This relationship continues to hold until a peak is reached, after which further increases in the magnitude of $$\frac{(N_b)^2}{R_b}$$

causes a net reduction in the gain of the amplifier by reason of the fact that in this latter region, the efficiency of the control signal differential reset action decreases at a more rapid rate than that at which the efficiency of the bias circuit energy coupling arrangement increases.

The curve of FIG. 8 may be specifically related to the amplifier shown in FIG. 4, in which case $N_b$ represents the number of turns of any one of the bias windings 60 through 63 and $R_b$ is the effective resistance of the circuit seen by the induced voltage in the bias circuit. It is pointed out, however, that the parameter relationships and magnitudes shown in FIG. 8 are presented merely as a typical example and that the information presented is not to be considered as in any way limiting.

It will be observed from the foregoing that I have provided a new and improved magnetic amplifier in which reset energy may be coupled between the core sections through the bias circuit in such a manner as to increase substantially the overall gain of the amplifier. I have found my invention particularly applicable to full wave, push-pull types of magnetic amplifiers, although others may find it suitable or advantageous in other applications. In addition, while I have presented a particular embodiment of my invention in considerable detail to provide a full and clear disclosure thereof, it will be apparent that the scope of my invention is not limited to the particular arrangement set forth. It should be recognized, therefore, that various changes, modifications and substitutions may be made in the embodiment presented herein without departing from the true scope of my invention as I have defined it in the appended claims.

What I claim as new and desire to secure by Letters Patent of the United States is:

1. In a push-pull self-saturating magnetic amplifier the combination comprising: two full wave sections, each of said two full wave sections including a plurality of magnetic paths, a bias winding associated with each of said magnetic paths, a control winding coupled to each of said magnetic paths, means connecting said bias windings in one of said full wave sections in series forming a first series circuit, means connecting said bias windings in other of said full wave sections in series forming a second series circuit and means connecting said first and said second series circuits in parallel with each other to form a self-biasing configuration, said bias windings being connected in a direction such that the differential reset energy coupled between said bias windings in each of said series circuits is in a direction to aid an input signal applied to said control winding.

2. A self-saturating magnetic amplifier comprising: four amplifier sections, a magnetic circuit associated with each of said four sections, a gate winding associated with each of said magnetic circuits, a control winding coupled to said sections to allow differential reset of pairs of said sections, an A.C. source connected to said gate windings which energizes two of said gate windings during a first half cycle and other two of said gate windings during the alternate half cycle, a biasing means associated with said magnetic circuits which couples energy from the two of said sections into other two of said sections to produce differential reset in a direction to aid a signal applied to said control winding.

3. A self-saturating magnetic amplifier comprising: four amplifier sections, each of said amplifier sections having saturating and reset intervals occurring alternately, a control winding coupled to said sections, a bias means associated with said amplifier sections, said bias means arranged to couple energy from two of said amplifier sections which may be passing through their saturating interval into other two of said amplifier sections which are simultaneously passing through their reset interval and to unequally bias said amplifier sections passing through their reset intervals in a direction aiding the differential reset produced by a signal applied to said control winding.

4. A self-saturating magnetic amplifier substantially as recited in claim 3 including also an input signal, said input signal coupled to said control circuit and the magnitude of said unequal bias being in accordance with the magnitude of said input signal.

5. In a full wave, push-pull self-saturating magnetic amplifier having at least four core sections with a first two of said sections forming one side of said amplifier and a second two of said sections forming the other side of said amplifier; a biasing arrangement comprising bias windings coupled to each of said cores to permit resetting thereof, means connecting the bias windings of said first two core sections in series with each other to form a first series connected set of windings, a control circuit coupled to said amplifier sections to allow differential reset of pairs of said sections, means connecting the bias windings of said second two core sections in series with each other to form a second series connected set of windings, and means connecting said first and second series connected sets of bias windings in parallel with each other, whereby energy may be coupled between said cores through said bias windings to produce a differential reset between the cores on the two sides of said amplifier while such cores are passing through their reset interval, said bias windings being coupled in a direction such that the differential reset produced thereby is in the same direction as an input signal applied to said control circuit.

References Cited in the file of this patent

"Magnetic Amplifier Circuits," by William A. Geyger, published by McGraw-Hill Book Co., January 29, 1954.